Dec. 15, 1964 J. H. McCARVELL ETAL 3,161,207
CONTROL DEVICE FOR CONTROLLING THE UPPER AND LOWER
LIMITS OF THE PRESSURE IN A FLUID FLOW LINE
Filed April 13, 1961 3 Sheets-Sheet 3
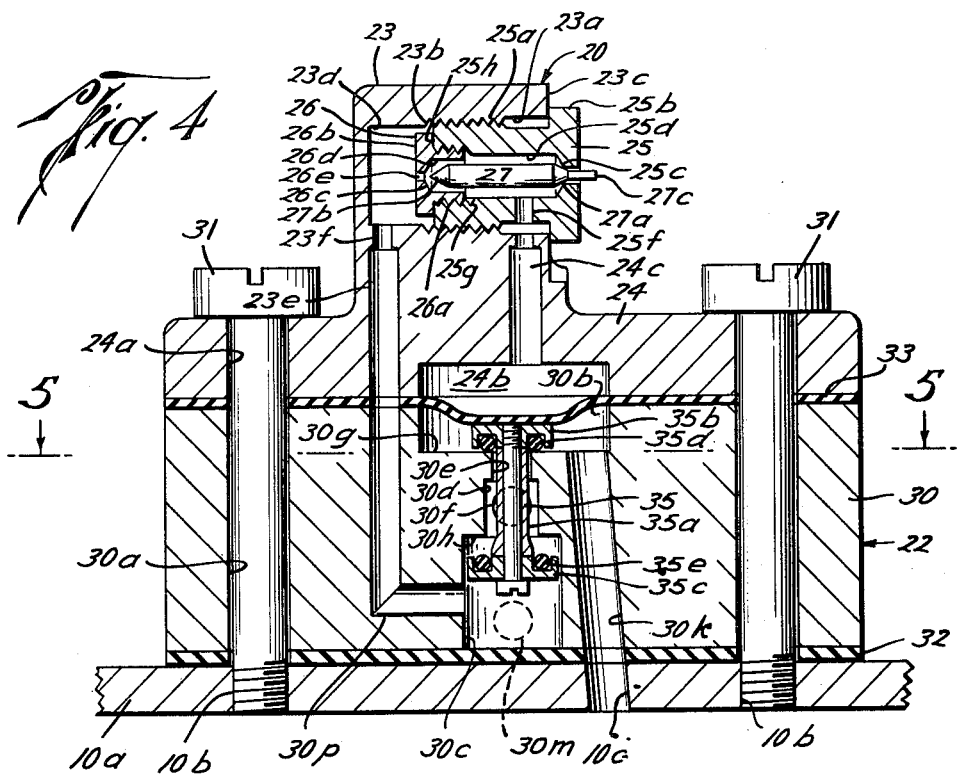
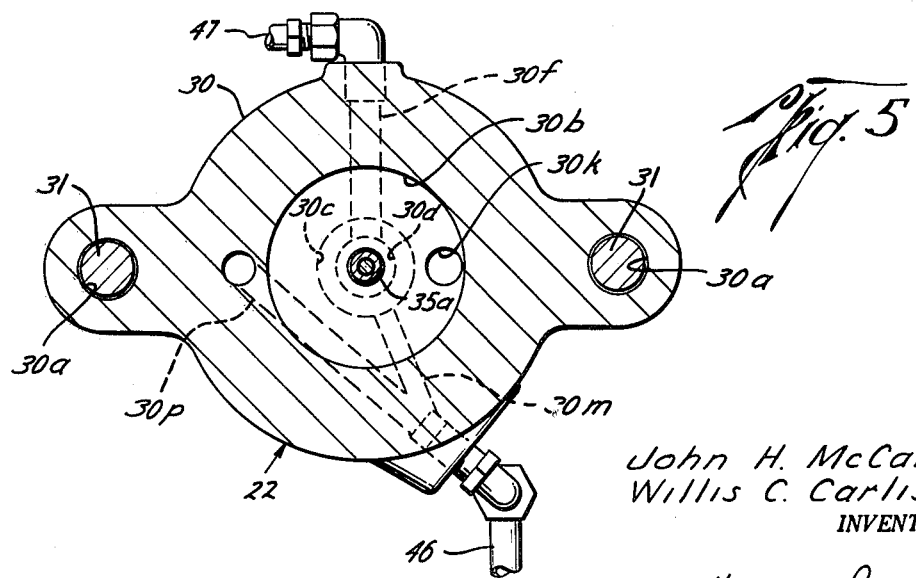
John H. McCarvell
Willis C. Carlisle
INVENTORS
BY Hayden & Pravel
ATTORNEYS United States Patent Office 3,161,207
Patented Dec. 15, 1964

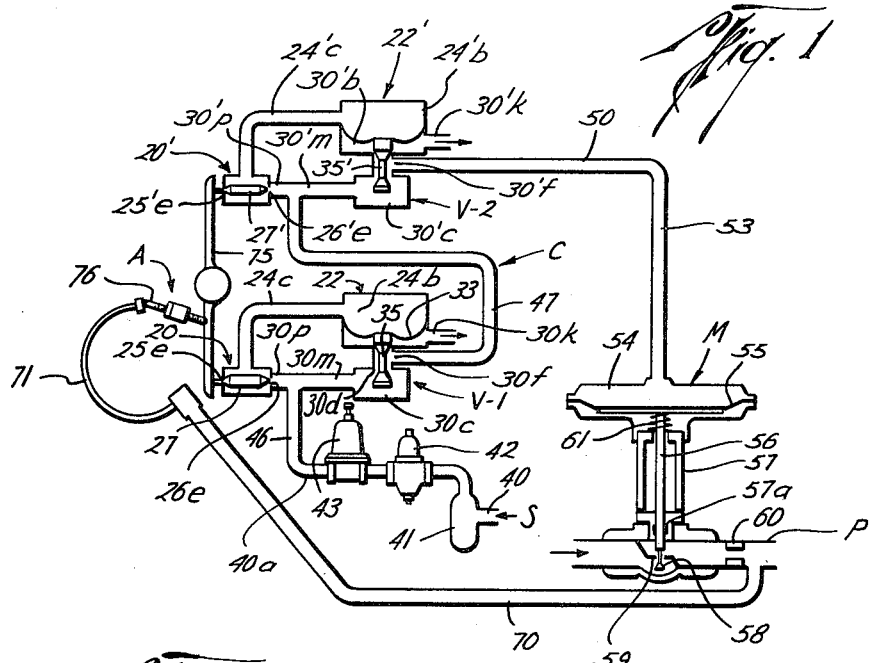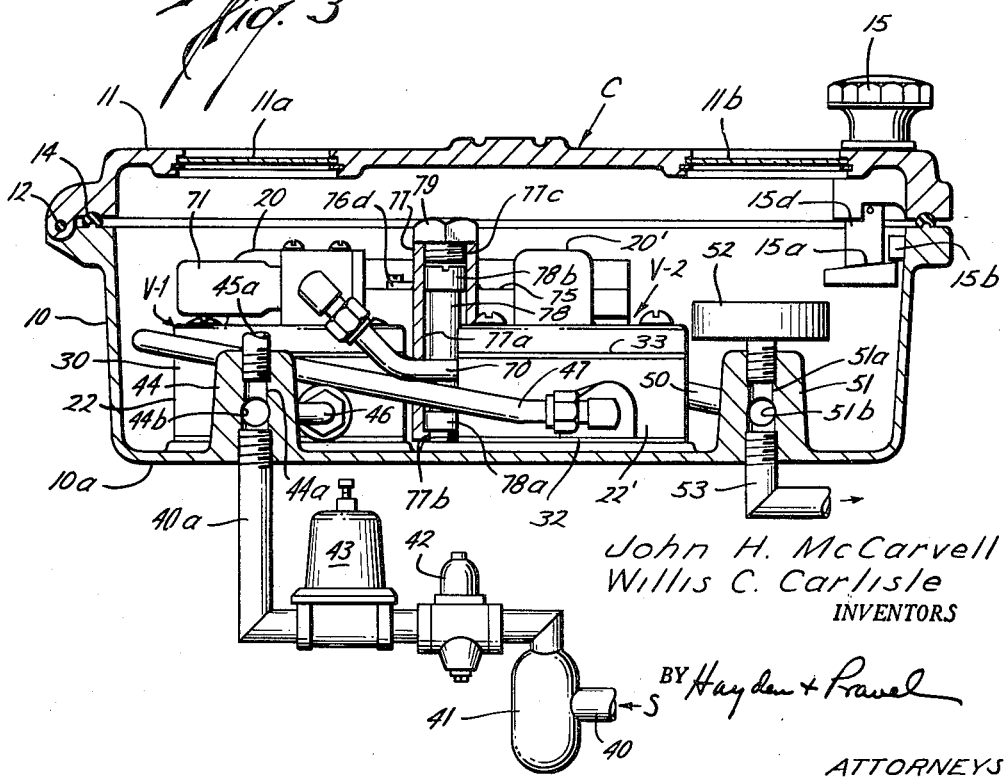

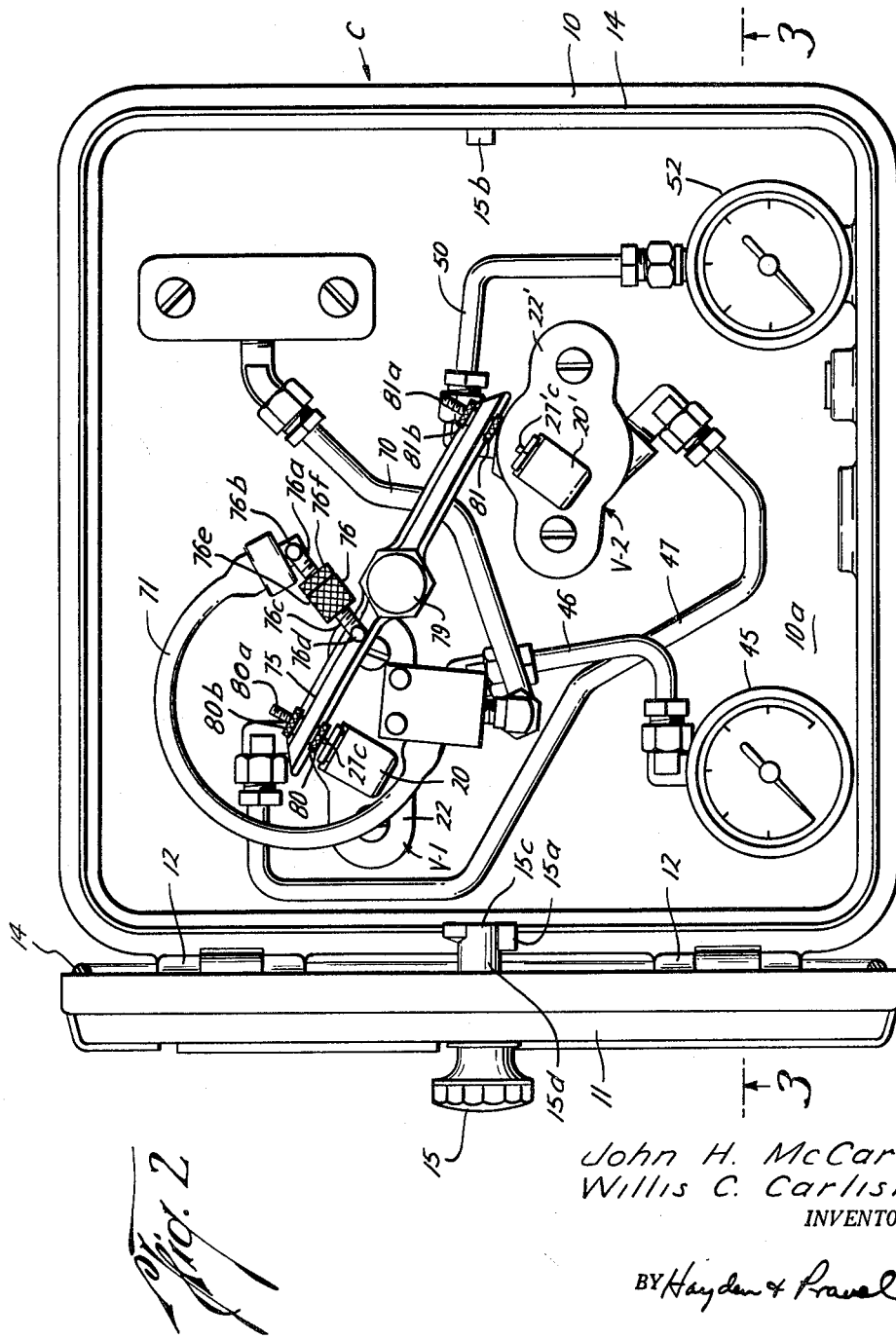

3,161,207
CONTROL DEVICE FOR CONTROLLING THE UPPER AND LOWER LIMITS OF THE PRESSURE IN A FLUID FLOW LINE
John H. McCarvell and Willis C. Carlisle, both of 1525 Prince St., Houston 8, Tex.
Filed Apr. 13, 1961, Ser. No. 102,718
4 Claims. (Cl. 137—492.5)

This invention relates to new and useful improvements in control devices, and particularly control pilots for controlling fluid pressure in a fluid flow line.

An object of this invention is to provide a new and improved control device which is adapted to accurately maintain a predetermined fluid pressure differential flowing in a pipe or line.

An important object of this invention is to provide a new and improved control pilot which is adapted to automatically control the high and low limits of fluid pressure in a line.

Another object of this invention is to provide a high-low fluid pressure control device which is adapted to be used in conjunction with a fluid-actuated valve in a flow line for controlling the high and low fluid pressure of fluid flowing in the flow line.

A further object of this invention is to provide a new and improved control pilot for controlling fluid pressure which pilot has means therewith for setting the differential range of the fluid pressure and also means for setting the maximum and minimum pressures for the selected fluid pressure differential.

Still another object of this invention is to provide a new and improved control pilot for maintaining a fluid pressure differential which pilot has a single Bourdon tube for actuating a pair of control valves, one of said valves controlling the upper limit of the pressure differential and the other of said valves controlling the lower limit of the pressure differential, whereby extreme accuracy in controlling such upper and lower limits of the fluid pressure is obtained.

A specific object of this invention is to provide a new and improved control pilot for maintaining a predetermined fluid pressure differential wherein a high limit valve assembly and a low limit valve assembly are used which are controlled by a pivoted control arm and a Bourdon tube operably connected therewith.

The preferred embodiment of this invention will be described hereinafter, together with other features thereof, and additional objects will become evident from such description.

The invention will be more readily understood from a reading of the following specification and by reference to the accompanying drawings forming a part thereof, wherein an example of the invention is shown, and wherein:

FIG. 1 is a schematic view of the control device or pilot of this invention in combination with a motor valve mounted in a flow pipe or line;

FIG. 2 is an elevation of the control device or pilot of this invention;

FIG. 3 is a cross-sectional view taken on line 3—3 of FIG. 2, except that the cover for the device is shown in a closed position in FIG. 3 rather than the open position of FIG. 2;

FIG. 4 is a sectional view of one of the valve assemblies of the control device or pilot of this invention; and FIG. 5 is a cross-sectional view taken on line 5—5 of FIG. 4 to further illustrate the details of the valve assembly shown in FIG. 4.

In the drawings, the control device or pilot of this invention is designated generally with the letter C and, as shown in FIG. 1, such control device C is adapted to be connected with a motor valve M mounted in a flow line or pipe P. As will be explained more in detail hereinafter, the control device or pilot C includes a first valve assembly V-1 and a second valve assembly V-2 which are operated by a fluid pressure actuating means A having connection with the flow line or pipe P. Briefly, the pressure actuated means A is operable in response to changes in the fluid pressure in the line or pipe P for operating the valve assemblies V-1 and V-2 which thus serve as a pilot or control for the motor valve M to maintain the fluid flowing in the line P at a predetermined fluid pressure differential. As will be more fully explained, the pressure actuating means A is so constructed that the desired fluid pressure differential may be selected and also the upper and lower limits of such fluid pressure differential may be set at predetermined values. With the fluid pressure differential set at the selected upper and lower limits, the control device or pilot C of this invention automatically and accurately maintains such differential within such limits.

Considering the invention more in detail, the control device or pilot C of this invention is preferably mounted within a housing or case 10 which has a cover 11 hinged thereto with hinges 12 (FIGS. 2 and 3). The housing 10 and the cover 11 are preferably made of iron or steel, although other materials will serve the purpose. Preferably, in order to confine the control pilot C within a closed dust proof and preferably waterproof area, a gasket 14 of rubber or similar material is positioned around the meeting edges or surfaces of the housing 10 and the cover 11. A locking handle 15 of any convenient type may be employed to lock the cover 11 to the housing 10 during use. As shown, the handle 15 has a cam 15a which serves to wedge or lock underneath a fixed pin 15b mounted within the housing 10. The wedge or cam 15a has a segment 15c omitted therefrom (FIG. 2) so that the locking handle 15 with its corresponding shaft 15d may be withdrawn upwardly from the position shown in FIG. 3 to open the cover 11 to the position shown in FIG. 2. The handle 15 is of course rotated until the open segment or gap 15c is aligned with the lug 15b in order to permit the opening of the cover 11. The cover 11 has windows 11a and 11b which are preferably made of glass or plastic through which the gauges to be hereinafter described are visible when the cover 11 is closed.

The valve assemblies V-1 and V-2 are suitably mounted within the housing 10 and, as will be explained, are secured to the back surface or portion 10a of the housing 10. The valve assembly V-1 includes a control valve 20 and an operating valve 22. The valve assembly V-2 includes a control valve 20' which corresponds with the control valve 20 of the valve assembly V-1. The valve assembly V-2 also includes an operating valve 22' which corresponds with the operating valve 22 of the valve assembly V-1. Since the valve assemblies V-1 and V-2 are identical in construction, the details of the valve V-1 only have been illustrated in FIGS. 4 and 5.

It should be noted that in FIG. 4 of the drawings, the control valve 20 has been rotated 60 degrees for the purposes of clarity in illustration, but the preferred position for the control valve 20 with respect to the operating valve 22 is shown in FIGS. 2 and 3. Referring now to FIGS. 4 and 5 in particular, the control valve 20 includes a mounting body 23 which is preferably formed integrally with a laterally extending flange 24 having bolt openings 24a therethrough. The valve body 23 has a bore 23a formed therein which is threaded at 23b for receiving an outer seat plug or sleeve 25 having external threads 25a thereon. The outer valve seat plug 25 has a flange 25b which engages with the longitudinal surface 23c of the body 23. The plug 25 has a valve seat 25c between an internal bore 25d and an outlet port 25e. The plug 25 also has a lateral port or hole 25f, the purpose of which will be explained hereinafter. The inner portion of the bore 25d is threaded at 25g to receive an inner valve seat plug 26 which has external threads 26a formed thereon for threaded engagement with the threads 25g. The valve seat plug 26 has an external flange 26b which is adapted to engage the end surface 25h of the plug 25. A valve seat 26c is formed in the plug 26 between the bore 26d and an outlet port 26e.

A needle valve member 27 is disposed within the bores 25d and 26d so that one end 27a thereof is adapted to engage the seat 25c to close fluid flow through the opening 25e while fluid flow is permitted through the opening 26e. The valve member 27 also has a valve surface 27b on the other end which is adapted to engage the valve seat 26c to close the hole or port 26e while the port or opening 25e is open. A rod extension 27c is mounted on the end of the valve member 27 adjacent the valve surface 27a and is adapted to extend through the port or hole 25e, but without restricting fluid flow therethrough, for a purpose to be hereinafter described.

The control valve 22 has a body 30 with bolt openings 30a therethrough, which openings 30a are adapted to be aligned with the bolt openings 24a of the flange 24 for receiving bolts 31 which serve to secure both of the valves 20 and 22 to the rear or inner plate 10a of the housing 10. For this purpose, the inner plate 10a has threaded openings 10b formed therein for receiving the threaded bolts 31. A sealing gasket 32 made of rubber or other similar material is tightly positioned between the body 30 and the plate 10a. A diaphragm 33 of rubber or similar flexible material is tightly clamped between the flange 24 and the body 30. The diaphragm 33 extends through a fluid pressure cavity which is formed by a recess 24b in the flange 24 and a recess 30b in the body 30. The diaphragm 33 is sufficiently flexible to move upwardly and downwardly within the cavity formed by the recesses 24b and 30b in response to changes in fluid pressure on each side of the diaphragm 33.

The body 30 is also provided with a lower cavity or recess 30c which is interconnected with the recess 30b by means of a bore 30d and a reduced diameter counterbore 30e. The bore 30d has a lateral opening 30f in communication therewith for a purpose to be hereinafter explained.

A valve member 35 having a central valve stem 35a and an upper sealing head 35b and a lower sealing head 35c is mounted for reciprocating movement within the body 30. The head 35b is located within the recess 30b and is provided with a seal ring 35d which is preferably an O-ring which is adapted to seat and seal against a lateral surface 30g in the recess 30b. The head 35c is provided with a seal ring 35e such as an O-ring which is adapted to seat against a lateral surface 30h in the recess 30c. When the seal ring 35d is in engagement with the surface 30g, fluid communication between the recess 30b and the bore 30d is prevented, but the seal ring 35e is away from its seat 30h and therefore fluid communication between the recess 30c and the bore 30d is permitted. When the valve member 35 is raised from the position shown in FIG. 4 so as to bring the seal ring 35e into contact with the surface 30h, then the seal ring 35d is raised above the surface 30g so that fluid communication between the recess 30c and the bore 30d is prevented, but fluid communication is permitted between the the recess 30b and the bore 30d. As stated, the seal rings 35d and 35e are preferably O-rings formed of rubber or similar sealing material, and the seal ring 35e has a larger area than the upper seal ring 35d. By way of example, the lower seal ring 35e has an external diameter of .312 inch and the upper seal ring 35d has an external diameter of .250 inch, with both of the seal rings having a 1/16 inch cross-sectional diameter. With such construction, when a pressure is applied to the valve member 35 from the recess or chamber 30c, and with atmospheric pressure in the chamber 24b, the valve member 35 will move the seat the seal 35e with the seat surface 30h, since the chamber 30b is open to atmosphere through a hole 30k in the body 30 and a hole 10c in the plate 10a. The gasket 32 also has a corresponding opening 32a therethrough in alignment with the holes 30k and 10c so that fluid communication is established from the chamber 30b to the atmosphere externally of the plate 10a.

For supplying air or gas under pressure to the valves 20 and 22, an inlet hole 30m (FIG. 5) is provided in the body 30 for establishing fluid communication from externally of the body 30 to the chamber or recess 30c. For ease in drilling, the hole 30m is connected with another passage 30p (FIGS. 4 and 5) so that the gas under pressure is directed from the hole 30m to the hole 30p. However, for clarity of illustration, the hole 30p is shown in FIG. 4 as extending to the chamber 30c, which is a possible construction since the hole 30m also connects with the chamber 30c. The hole 30p is in fluid communication with a chamber 23d through a passage 23e having a counterbore passage 23f therewith to establish communication with the valve opening 26e when it is open. The bore of the valve body 23 is in communication with the chamber 24b above the diaphragm 33 through passages 27a and 24c.

The air or gas under pressure is supplied from any suitable source S to a flow line 40 which has a conventional drip chamber 41 therein for collecting moisture or condensate in the gas. The gas under pressure then flows to a conventional high pressure regulator 42 where the pressure is reduced down to about 100 pounds per square inch and then the gas passes to a low pressure regulator 43 where the pressure of the gas is further reduced down to the operating pressure of about 20 pounds per square inch. It will be appreciated that one pressure regulator may be used instead of the two regulators 42 and 43, if desired, but the two are preferably employed in order to prevent the possibility of a freezing of any condensate in the gas. The gas then flows at the operating pressure through the end 40a of the line 40 into a three-way fitting 44 which is formed integrally with the plate 10a. The bore 44a of the fitting 44 has a pressure gauge 45 (FIG. 2) connected therewith by means of the gauge stem 45a (FIG. 3) which is threaded into the fitting 44. Such gauge 45 indicates the supply pressure of the gas used in the actuation and control of the control device C. A lateral opening 44b also extends from the three-way fitting so that the gas under pressure flows from the fitting 44a through the opening 44b to a connector tube 46 which is connected to the passage 30m and the passage 30p of the body 30 (FIG. 5).

The first valve assembly V–1 is connected with the second valve assembly V–2 by a connector tube 47 (FIGS. 2, 3 and 5) to direct the fluid pressure from the chamber or bore 30d of the valve assembly V–1 to the inlet passages 30'p and 30'm (FIG. 1) which correspond with the passages 30p and 30m in the assembly V–1. As indicated in FIG. 1, the valve assembly V–2 has corresponding elements and connection passages to the assembly V–1 and they are therefore designated with the same letters and numerals with the addition of a prime mark. The line 30'f of the assembly V–2 is connected with a connector tube 50 which has connection with a second three-way fitting 51 formed integrally with the plate 10a. Such three-way fitting 51 has a bore 51a therethrough with a pressure gauge 52 connected at one end and a connector tube 53 connected at the other end. Also, the three-way fitting has a lateral opening 51b which is connected to the connector tube 50. The tube 53 goes to the motor valve M, a simplified version of which is illustrated in FIG. 1. The motor valve M is preferably of the type disclosed in the United States Patent No. 2,674,267 granted to J. H. McCarvell, which valve has been shown in simplified form in FIG. 1. As shown in FIG. 1, the motor valve M includes an upper diaphragm chamber 54, the lower portion of which is defined by a diaphragm 55 formed of rubber or similar flexible material. The diaphragm 55 is connected to a valve stem 56 which extends through a chamber or housing 57 and fluid seals 57a. The valve M is mounted in the line P through which the fluid under pressure is flowing. The valve element 58 at the lower end of the valve stem is adapted to move into and out of engagement with a valve seat 59 for controlling the flow of the fluid in the line or pipe P as it moves from the left to the right as viewed in FIG. 1. A control orifice 60 may also be employed within the pipe line P for preventing surges of the fluid. The valve member or element 58 is urged to a seated or closed position in contact with the valve seat 59 by a spring 61 or, if the spring 61 is not utilized, the pressure of the fluid on the upstream side urges the valve element 58 to the closed position in the absence of fluid under pressure within the chamber 54. The valve element 58 is urged downwardly to open the flow of fluid through the valve from the upstream side to the downstream side when the pressure is sufficiently great enough to overcome the pressure of the spring 61 or the upstream pressure in the line P. It will be appreciated that other types of valves may be utilized in connection with this invention other than the motor valve M which is illustrated in FIG. 1, but such valve M is illustrated as the preferred type of valve to be used in conjunction with the control pilot C of this invention.

The actuator means or mechanism A of the control pilot C of this invention is connected with the pipe line P through a connector tube 70 which is connected at the back plate 10a by a suitable connector tube (not shown). The connector tube 70 is connected to one end of a Bourdon tube 71 which is of known construction and which is adapted to expand when the pressure of the fluid within the tube 71 increases and to contact when the pressure within the tube 71 decreases.

The free end of the Bourdon tube 71 is connected to a pivoted actuating arm 75 by means of a turnbuckle 76. The turnbuckle 76 has a threaded rod 76a pivotally connected at 76b to the free end of the Bourdon tube 71. Another threaded rod 76c is pivotally connected at 76d to the arm 75. A nut 76e which is threaded to both the rod 76a and the rod 76c in the manner of a turnbuckle is adapted to change the length of the turnbuckle connector 76 for a purpose to be explained hereinafter. A lock nut 76f is threaded on the threaded rod 76a to lock the turnbuckle nut 76e in the selected position.

The actuator arm or bar 75 includes a central boss 77 which is preferably formed integrally with the extensions of the arm 75 on each side of the boss. The boss 77 (FIG. 3) has a bore 77a, a lower flanged end 77b and an upper threaded end 77c. A pivot or bearing post 78 is threaded or otherwise secured to the plate 10a at its lower end (FIG. 3). The post 78 is provided with a lower bearing ring 78a which fits above the shoulder 77c of the boss 77 to locate the boss 77 in its proper position to also provide a bearing surface for the lower end of the boss 77. The upper end of the post 78 is provided with an enlargement 78b which provides an upper bearing surface in contact with the wall of the bore 77a of the boss 77. A retaining cap 79 is threaded into the threads 77c of the boss 77 to locate the boss in its proper position on the post 78.

At one end of the arm 75, an adjustable contact member 80 is mounted for engagement with the extension rod or pin 27c (FIG. 2) of the control valve 20. The contact head 80 has a threaded bolt or rod 80a formed integrally therewith which is threaded through a suitable threaded opening (not shown) through the bar 75. A lock nut 80b is provided on the threaded bolt 80a to lock the contact head 80 in the selected position. At the other end of the actuating arm 75, a similar contact head 81 is also provided with a threaded bolt or rod 81a which is threaded through a suitable opening in the actuator bar or member 75, and a lock nut 81b is provided for locking the contact head 81 in the selected position. The contact head 81 is adapted to engage the rod extension 27'c of the control valve 20', as will be more fully explained.

In the operation or use of the apparatus of this invention, the contact heads 80 and 81 are initially adjusted to obtain the desired high and low cutout points for the fluid pressure in the pipe line P. Such initial adjustment of the pressure differential may be accomplished with controlled pressures in the pipe line P, or by connecting the control pilot C to any other controlled source of fluid pressure initially to get the differential setting of the high and low cutout points. Thus, assuming that the high pressure cutoff point is to be 1000 pounds per square inch, and the low cutoff point is to be 800 pounds per square inch so as to provide a 200 pounds per square inch differential, the low cutoff point may be first established by dropping the pressure in the pipe line P below 800 pounds per square inch and adjusting the contact head 80 so that it is in engagement with the extension rod 27c to hold the valve member 27 with the valve surface 27b in contact with the valve seat 26c. The contact head 81 is adjusted so that it contacts the tube extension 27'c to hold the valve member 27' in a position to close fluid flow through the valve seat 20'e when the pressure P reaches the high cutoff point of 1000 pounds per square inch. With such a pressure differential of 200 pounds per square inch thus established or selected, the upper and lower limits of the differential may be changed if and when desired by adjusting the turnbuckle connector 76. Thus, if it is desired to reduce the upper limit of the high cutoff point to 800 pounds per square inch and the lower cutoff point to 600 pounds per square inch, the turnbuckle is lengthened. If, on the other hand, it is desirous to raise the high and low cutoff points, the turnbuckle 76 is adjusted to shorten its length.

Assuming that the pressure differential and the high and low cutoff pressures have been selected as previously described, when the pressure of the fluid in the flow line P is within the pressure limits so set, the valve assemblies V-1 and V-2 will be in the positions schematically illustrated in FIG. 1. Under such circumstances, the control valve 20 is in the position shown in FIG. 1 so that the opening 25e is closed and the opening 26e is open. The supply gas from the line 46 thus flows through the passage 30p, the port 26e, the passages 27a and 24c to the chamber or space 24b above the diaphragm 33. The fluid pressure force acting on the diaphragm 33 in the chamber 24b is sufficient to hold the valve member 35 in the position shown in FIGS. 1 and 4 so as to close fluid communication between the chamber 30d and the chamber 30b while permitting fluid communication from the chamber 30c to the chamber 30d and thus to the line 47.

Again, since the pressure conditions within the pipe line P are within the preset pressure range, the valve 20' is in the position shown in FIG. 1 so that the opening or port 26'e is open and the port 25'e is closed. The supply gas pressure from line 47 is thus directed to the chamber 24'b to hold the valve member 35' in the lower position as shown in FIG. 1 so that the supply gas flows to the upper chamber 54 of the motor valve M. The motor valve M thus is in the position shown in FIG. 1 so that the fluid flow through the pipe line P is permitted.

If at any time the downstream pressure below the orifice 60 exceeds the selected high pressure cutout point, the Bourdon tube 71 is expanded sufficiently to rotate or pivot the actuator arm 75 to force the control valve 20' to the right from the position shown in FIG. 1 so as to close the opening or port 26'e and open the port 25'e. When the control valve 20' is in such position, the chamber 24'b above the operating valve member 35' is exposed to atmosphere through the port 25'e. The pressure in the chamber 30'c from the supply gas is thus sufficient to move the valve member 35' upwardly from its position shown in FIG. 1 to connect the line 50 with the chamber 39'b and the outlet opening 30'k. Thus, the chamber 54 of the motor valve M is open to the atmosphere, allowing the pressure in such chamber 54 to drop, at which time the spring 61 or other suitable means serves to move the valve stem 56 and the valve member 58 upwardly to stop the fluid flow through the line P from the upstream side of the valve M to the downstream side thereof. When the pressure returns to the normal operating range, the Bourdon tube 71 is returned to the position shown in FIG. 1 so that both of the control valves 20 and 20' are in the positions shown and then the motor valve M is also in the position shown in FIG. 1 so that fluid flow through the line P is again resumed.

In the event the pressure in the line P falls below the low cutoff point or minimum pressure which has been set previously, then the pressure in the line 70 drops to cause a contraction of the Bourdon tube 71 which causes a rotation of the actuator arm 75 to move the valve element 27 so as to close the port 26e and open the port 25e. When such condition occurs, the gas under pressure in the chamber 24b is exhausted to atmosphere through the opening 25e. The gas supply under pressure acts against the valve member 35 to move it upwardly from the position shown in FIG. 1 so as to connect the line 47 to the chamber 30b and the exhaust opening 30k. Since the line 47 is connected through the line 50 to the motor valve M, the pressure in the chamber 54 is again exhausted to atmosphere through the opening 30k and the motor valve M again operates to move the valve element 58 into contact with the seat 59 to close the valve and prevent further flow through the pipe line P until the pressure in the pipe line P is again raised within the operating pressure differential previously set.

With the apparatus of this invention, the fluid pressure flowing in a line may be accurately controlled as to both an upper and a lower limit, although just one of such limits may be controlled if desired. The pressure differential selected is automatically controlled with this device, although a manual reset may be employed if desired. Due to the adjustments that are possible with this device, it is very versatile. Also, because of the construction of the device, it is highly accurate and extremely rugged, which makes the device highly desirable for field use.

The foregoing disclosure and description of the invention is illustrative and explanatory thereof and various changes in the size, shape and materials, as well as in the details of the illustrated construction, may be made within the scope of the appended claims without departing from the spirit of the invention.

What is claimed is:

1. A control device for controlling the upper and lower limits of the pressure of a fluid flowing in a line, comprising: a source of fluid pressure separate from the fluid in the line, a first valve assembly for controlling the lower limit of the fluid pressure in the line, a second valve assembly for controlling the upper limit of fluid pressure in the line, said first valve assembly having a first control valve and a first operating valve interconnected by a first fluid passage means, said second valve assembly having a second control valve and a second operating valve interconnected by a second fluid passage means, a third fluid passage means connecting the inlet of said first valve assembly to said separate source of fluid pressure, a fourth fluid passage means connecting the outlet of said first valve assembly with the inlet of said second valve assembly, a single pivoted lever for controlling the opening and closing of said first and second control valves, a Bourdon tube adapted to be connected to the fluid pressure in the line and having one end fixed and the other end movable, an attachment means attaching the movable end of the Bourdon tube to said pivoted lever for moving said lever in response to fluid pressure changes in the line, means for transmitting the movement of the lever in one pivotal direction to said first control valve to close same to fluid pressure from said pressure source when the pressure in the line falls below a predetermined lower limit, and additional means for transmitting the movement of the lever in the other pivotal direction to said second control valve to close same to fluid pressure from said first valve assembly when the pressure in the line exceeds a predetermined upper limit.

2. The structure set forth in claim 1, wherein said attachment means is adjustable for thereby changing the upper and lower pressure limits at which said control valves are actuated while keeping the pressure differential the same.

3. The structure set forth in claim 1, wherein said attachment means is adjustable for thereby changing the upper and lower pressure limits at which said control valves are actuated while keeping the pressure differential the same, and wherein said means for transmitting the movements to the lever are separately adjustable for varying the upper pressure limit or the lower pressure, or both.

4. In combination with a fluid-pressure operated valve in a line having fluid flowing therein, and a control pilot connected to said valve, the improvement residing in the control pilot, comprising: a source of fluid pressure separate from the fluid in the line, a first valve assembly for controlling the lower limit of the fluid pressure in the line, a second valve assembly for controlling the upper limit of fluid pressure in the line, said first valve assembly having a first control valve and a first operating valve interconnected by a first fluid passage means, said second valve assembly having a second control valve and a second operating valve interconnected by a second fluid passage means, a third fluid passage means connecting the inlet of said first valve assembly to said separate source of fluid pressure, a fourth fluid passage means connecting the outlet of said first valve assembly with the inlet of said second valve assembly, a fifth fluid passage means connecting the outlet of said second valve assembly to said fluid-pressure operated valve, a single pivoted lever for controlling the opening and closing of said first and second control valves, a Bourdon tube adapted to be connected to the fluid pressure in the line and having one end fixed and the other end movable, an attachment means attaching the movable end of the Bourdon tube to said pivoted lever for moving said lever in response to fluid pressure changes in the line, means for transmitting the movement of the lever in one pivotal direction to said first control valve to close same to fluid pressure from said pressure source when the pressure in the line falls below a predetermined lower limit, and additional means for transmitting the movement of the lever in the other pivotal direction to said second control valve to close same to fluid pressure from said first valve assembly when the pressure in the line exceeds a predetermined upper limit.

References Cited in the file of this patent

UNITED STATES PATENTS

| | | |
|---|---|---|
| 1,110,320 | Fulton | Sept. 15, 1914 |
| 1,606,426 | Justen | Nov. 9, 1926 |
| 2,211,319 | Camerota | Aug. 13, 1940 |
| 2,376,918 | Hughes | May 29, 1945 |
| 2,944,562 | Glasgow | July 12, 1960 |
| 3,002,526 | Terral | Oct. 3, 1961 |
| 3,007,492 | Grimmer | Nov. 7, 1961 |
| 3,043,331 | Peters | July 10, 1962 |
| 3,055,345 | Johnson | Sept. 25, 1962 |